United States Patent

[11] 3,590,268

| [72] | Inventor | Chandra K. N. Patel<br>Summit, N.J. |
|---|---|---|
| [21] | Appl. No. | 869,649 |
| [22] | Filed | Oct. 27, 1969 |
| [45] | Patented | June 29, 1971 |
| [73] | Assignee | Bell Telephone Laboratories, Incorporated<br>Murray Hill, Berkeley Heights, N.J. |

[54] COHERENT OPTICAL OSCILLATOR EMPLOYING TUNABLE MIXED EXCITATIONS
4 Claims, 3 Drawing Figs.

[52] U.S. Cl. .................................................. 307/88.3,
321/69, 331/107
[51] Int. Cl. ...................................................... H03f 7/00
[50] Field of Search ........................................... 307/88.3;
321/69; 331/107

[56] References Cited
UNITED STATES PATENTS
3,470,453  9/1969  Fleory et al. .................. 307/88.3

OTHER REFERENCES
Patel et al., PHYSICAL REVIEW LETTERS, Feb. 17, 1969, pp. 282— 284.

*Primary Examiner*— John Kominski
*Assistant Examiner*— Darwin R. Hostetter
*Attorneys*— R. J. Guenther and Arthur J. Torsiglieri ABSTRACT: The coherent optical Raman oscillator disclosed employs a semiconducting crystal having simultaneously Raman-active and infrared-active phonons. The oscillator has an optical resonator for the scattered light and is end pumped with intense coherent circularly polarized light. The oscillator is tuned by controlling the charge carrier concentration pertinent to the scattering by injected carriers and by a variable magnetic field directed along the resonator axis. This magnetic field may vary through both polarities to provide the full tuning range.

INVENTOR
C.K.N. PATEL

COHERENT OPTICAL OSCILLATOR EMPLOYING TUNABLE MIXED EXCITATIONS

BACKGROUND OF THE INVENTION

In the coherent optical device art, a highly desirable sort of device is one that is continuously tunable over a broad band of frequencies. Moreover, among tunable devices the most desirable are those in which the tuning requires no mechanical adjustment.

In particular, future optical communication systems may need broadly tunable local oscillator sources, particularly for optical superheterodyne systems analogous to present-day radio systems.

Many tunable coherent optical devices employing optically nonlinear effects or light-scattering effects have been proposed; but few combine the advantages of strong effects and broad tunability. Strong effects are desirable for the sake of efficiency and in view of the fact that nearly all such tunable devices must be pumped with coherent light, typically at a single fixed frequency as obtained from a laser. Such pumping light of the desired quality and power level is obtained only at relatively great expense.

One of the stronger scattering effects observed in prior Raman-scattering experiments is the so-called polariton scattering. A polariton is a combination of excitations within a crystal and, in its most specific sense, includes a propagating photon and a transverse optical phonon having nearly the same momenta and energy in a crystal. A transverse optical phonon is a lattice vibration in which adjacent atoms move in opposite directions orthogonal to the direction of propagation of the energy of the vibration. A polariton, in its most general sense, is a mixed excitation, including a phonon coupled to a photon or other excitations coupled to photons. It can occur in the presence of a plasma or in the presence of both a plasma and a magnetic field. Hereinafter, I employ the term in its most general sense.

Typically, the strong scattering effects are obtained under conditions of phase matching. In other words, the Raman-scattered light propagates in the same direction as the pumping light and with a frequency and phase relation to the pumping light that provides continuous power transfer therefrom throughout an extended pathlength.

In order for the pumping light and the Raman-scattered light to propagate in the same direction under these conditions, typically only one scattered light frequency is feasible for a given pumping frequency. While some tunability is achievable with noncolinear phase matching, this technique reduces the interaction volume.

In my previously filed parent patent application, Ser. No. 799,677, filed Feb. 17, 1969, and assigned to the assignee hereof, I have proposed an optical oscillator employing a tunable polariton scattering without destroying either colinearity, phase matching, or adversely affecting the interaction volume. In that proposal, the frequency of the mixed excitation (hereinafter called a polariton) is modified either by changing the carrier concentration or an applied transverse magnetic field.

SUMMARY OF THE INVENTION

According to my invention, the tuning range of a coherent optical Raman oscillator employing polariton scattering and magnetic-field tuning can be substantially doubled. This improvement is provided by supplying circularly polarized pumping light and orienting the direction of the variable magnetic field to be collinear with the direction of pumping light propagation. The magnetic field can now be varied through zero, that is, its sense reversed with an effect solely on the sense of tuning. The frequency will continue to vary in the same sense as was obtained prior to the variation through zero field. This result is an improvement over the tuning of my above-cited copending application and in fact nearly doubles the range of tuning for a feasible maximum magnitude of the field.

In specific embodiments of my invention, carrier concentration is changed to accomplish further tuning by current injection or by two-photon absorption.

BRIEF DESCRIPTION OF THE DRAWING

Further features and advantages of my invention will be understood from the following detailed description, taken together with the drawing, in which.

DESCRIPTION OF THE ILLUSTRATIVE EMBODIMENTS

Figure 1:
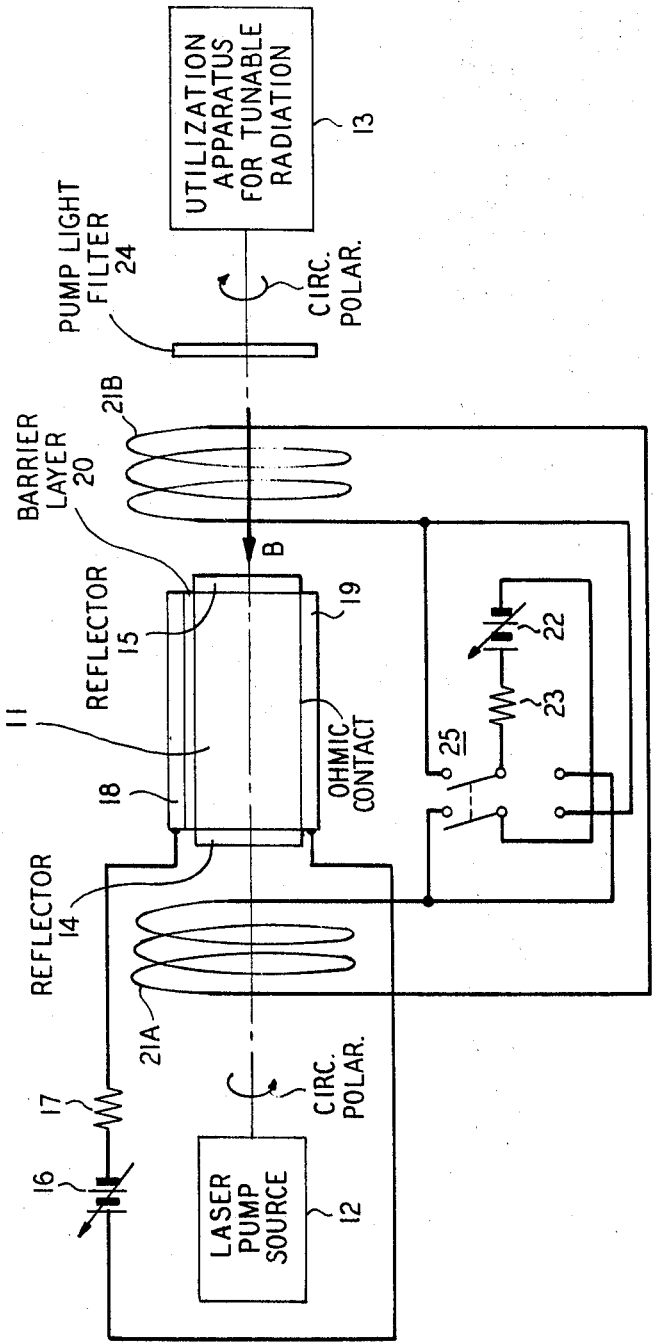
FIG. 1 is a partially pictorial and partially schematic illustration of a preferred embodiment of the invention.

In FIG. 1 it is desired to generate a tunable optical radiation in a semiconducting crystal 11 in response to coherent pumping radiation from a laser source 12. The output radiation from the crystal 11 is then utilized in apparatus 13, such as a heterodyne stage of an optical communication receiver. As is well known, a tunable local oscillator signal is highly useful for such applications.

The gallium arsenide crystal 11 is illustratively n-type with a carrier concentration of $1\times10^{10}$ per cubic centimeter and measures about 3 millimeters along each edge of its cubic body. Partially transmissive reflective coatings 14 and 15 of conventional type for the wavelengths of interest are disposed on opposed surfaces of crystal 11 orthogonal to an axis collinear with the direction of propagation of light from laser pump source 12, which direction is preferably the <111> crystalline direction in crystal 11. A control electrode 19 makes ohmic contact to one lateral surface of crystal 11 and another control electrode 18 makes rectifying contact to crystal 11 through a thin oxide barrier layer 20, through which injection of carriers can occur.

A variable direct current source 16 and a resistor 17 are connected in series between electrodes 18 and 19 in order to provide means for changing the carrier concentration in crystal 11 to provide one means of tuning the frequency of oscillation.

As the improved alternative means for changing the frequency of the mixed excitation from which Raman scattering occurs, a magnetic field is applied through crystal 11 collinear with the direction of propagation of the pump light by a field coil including halves 21A and 21B disposed on opposite sides of crystal 11 beyond reflectors 14 and 15 and connected across a source 22 of variable direct current voltage and a resistor 23. Source 22 and resistor 23 are connected through reversing switch 25 to coil halves 21A and 21B to enable reversal of the field direction. The value of this field provides an additional control of the frequency, significantly in the present case as the field itself varies over a wide range through both polarities. In order for this field control to be effective, it is preferred, but not necessary, to inject carriers. For example, one could instead employ a more heavily doped sample, e.g., $3\times10^7$ carriers per cubic centimeter.

The laser source 12 supplies circularly polarized light and is illustratively a continuous-wave solid-state laser employing neodymium ions in an yttrium aluminum garnet host and operating at 1.06 microns. Preferably, it operates in a low-order transverse mode of the laser resonator in order to obtain a circularly polarized output beam with divergence of less than 2 milliradians. The circular polarization can be achieved by a quarter-wave plate of known type at the output of a typical, neodymium ion laser producing linearly polarized light. In order for the crystal 11 to be substantially transparent to the pumping light, the photon energy of the pump light should be less than the band gap energy of crystal 11. This condition is clearly satisfied for the combination of neodymium ion laser and a gallium arsenide crystal. It may, in addition, be noted that in applications in which it is desired that the frequency of the output radiation be entirely independent of the pump light intensity, the photon energy of the light from source 12 should be less than one-half the band gap energy of crystal 11, or the intensity per unit area should be less than about $1 \times 10^8$ watts per square centimeter. The significance of this relationship will become clearer hereinafter in connection with the embodiment of FIG. 2. It should be clear that source 12 could also be pulsed.

In the operation of the embodiment in FIG. 1, the intensity level of source 12 exceeds the threshold for stimulating Raman scattering from a mixed excitation (polariton) in crystal 11 along the axis of the optical resonator formed by reflectors 14 and 15. For any given carrier concentration in crystal 11 there exists a polariton of frequency such that the scattered light propagates colinearly with the pump light, is circularly polarized in the opposite sense to the sense of the pumping light, and is phase matched to the polariton and the pump light. Addition of carriers changes the wave vector of the polariton at a given frequency and causes a polariton of a different frequency to be phase matched to the pump and scattered light. In turn, the frequency of the scattered light will be equal to the frequency of the pump light minus the frequency of that polariton.

Because of the phase matching and resonating of the forward scattered light, the process becomes strongly regenerative. The scattered light that is resonated strongly then becomes stimulated or all in phase. A coherent circularly polarized light beam at that scattered light frequency is obtained as an output.

If desired, any residual pump light not converted in crystal 11 may be separated from the circularly polarized output light by a pump light filter 24 before the output beam enters utilization apparatus 13. Alternatively, the filter 24 can be replaced by a quarter-wave plate and a linear polarizer (not shown) oriented to pass the scattered light, since the quarter-wave plate will convert the circularly polarized pump light and scattered light of opposite senses to orthogonal linear polarizations which are readily separated by such a polarizer. If the infrared emission at the polariton frequency must also be eliminated, filter 24 can include a band elimination filter at the polariton frequency.

With respect to the improvement which is the principal feature of my present invention, it is important to note the special relationship which exists between the circular polarizations of the light and the axial orientation of the variable magnetic field, which provides approximately twice the tuning range provided by the field in my above-cited copending patent application.

An understanding of the magnetic-field tuning effect upon the polariton scattering will be facilitated by the following background.

In the absence of a plasma in the semiconductive crystal 11, the polariton dispersion relationship is unchanged for any direction of linear polarization. Specifically, this is true when, as is the case in FIG. 1, the propagation direction of the pump light is along the <111> crystalline direction in the cubic crystal 11. From this fact concerning linear polarizations, one can deduce the general fact that the circularly polarized input pump light beam at frequency $\omega_o$ yields the Stokes and anti Stokes Raman-shifted frequencies $\omega_s$ and $\omega_{as}$, as for the case of linear pump polarization.

Let us consider the most probably Raman-scattering interaction with polaritons in crystal 11, namely one that produces a circularly polarized beam at the Raman-shifted frequencies. To conserve angular momentum, the polariton (the mixed excitation within crystal 11) taking part in this interaction has to be circularly polarized also. Note that the colinear polariton scattering, for which $\theta=0°$, will be promoted by the resonator of FIG. 1 where $\theta$ is the angle between input propagation direction and output Raman-shifted light beam propagation direction.

Let $\epsilon_{ox}+i\epsilon_{oy}$ (1)

described the right-hand circular polarization of the input wave, where $\epsilon_{ox}=\epsilon_{oy}$ for the circularly polarized wave. Then, $\epsilon_{1x}-i\epsilon_{1y}$ (2)

describes the output circularly polarized wave of opposite sense. Let $9(x \pm iy)$ (3)

describe the polarization of the polariton (mixed excitation) which produces the Stokes and antiStokes Raman scattering.

Since the <111> direction is a threefold symmetry direction, the angular momentum of the system must change by three quanta of angular momentum, or by none at all. Since the left-hand circularly polarized Stokes-scattering output represents two quanta of change from the output wave, the third quantum of change is supplied by the mixed excitation. The latter must therefore be left-hand circularly polarized.

For Stokes scattering the minus sign in formula (3) applies; and for antiStokes scattering, the plus sign in formula (3) applies.

The relationships for conservation of linear momentum are as follows:

$$\bar{k}_0 = \bar{k}_s + \bar{q}_s \qquad (4a)$$

and $$\bar{k}_0 = \bar{k}_s - \bar{q}_{as} \qquad (4b)$$

for Stokes and antiStokes scattering, respectively, where $\bar{k}_o$ is the wave vector for the pumping light, $\bar{k}_s$ is the wave vector for the Raman-scattered light, $\bar{q}_s$ is the wave vector of the mixed excitation for Stokes scattering and $\bar{q}_{as}$ is the wave vector of the mixed excitation for antiStokes scattering. Wave vector is the phase propagation constant divided by $2\pi$.

The relationships of equations (4a) and (4b) show that $\bar{q}_s$ and $\bar{q}_{as}$ are oppositely directed.

The frequency, $\omega$, and the magnitude of the wave vector, $q$, of the mixed excitation involved in the scattering are related through the relationship $$q^2 = \left(\frac{\omega}{c}\right)^2 \left[\epsilon(\infty) + \frac{\epsilon(0)-\epsilon(\infty)}{1-(\omega/\omega_{TO})^2}\right] \qquad (5)$$

which is generally applicable both to the polariton scattering described here and some species of polariton scattering described in my above-cited copending patent application, $c$ being the velocity of light,
$\epsilon(\infty)$ the high frequency dielectric constant,
$\epsilon(0)$ the low frequency dielectric constant, and
$\omega_{TO}$ the frequency of the transverse optical phonon.

Also, generally, for the case of a sufficient charge carrier concentration to produce a plasma in the semiconductor, $$q^2 = \left(\frac{\omega}{c}\right)^2 \left[\epsilon(\infty) + \frac{\epsilon(0)-\epsilon(\infty)}{1-(\omega/\omega_{TO})^2} - \frac{\epsilon(\infty)\omega_p^2}{\omega(\omega-i\omega_d)}\right] \qquad (6)$$

where $\omega_p$ is the plasma frequency and $\omega_d$ is the collision frequency for the electrons, and $(i\omega_d)$ provides a damping term in equation (6).

Of particular interest with respect to the present invention is the modification of equation (6) to account for the application of a magnetic field, B, parallel to $q$:

$$q^2 \pm = \left(\frac{\omega}{c}\right)^2 \left[\epsilon(\infty) + \frac{\epsilon(0)-\epsilon(\infty)}{1-(\omega/\omega_{TO})^2} - \frac{\epsilon(\infty)\omega_p^2}{\omega(\omega \pm \omega_c - i\omega_d)}\right] \qquad (7)$$

where $\omega_c$ is the cyclotron frequency associated with the field, B, and $q+$ is the value of $q$ for a right-hand circularly polarized polariton (antiStokes) propagating in the positive direction of the field or is the value of $q$ for a left-hand circularly polarized polariton (Stokes) propagating against, or antiparallel to the positive direction of the field. Conversely, $q-$ is the value of $q$ for a left-hand circularly polarized polariton (Stokes) propagating in the positive direction of the field or is a right-hand circularly polarized polariton (antiStokes) propagating against, or antiparallel to, the positive direction of the field. The sense of polarization is determined in each case as viewed in the direction of pump light propagation. The words "Stokes" or "antiStokes" in parentheses in the foregoing indicate the type of scattering in each case, for a right-hand circularly polarized pump light beam.

In view of the fact that the threshold for Stokes scattering is lower than for antiStokes scattering, Stokes scattering will be observed most readily in the embodiment of FIG. 1. Note that the Stokes polariton propagates antiparallel to the field direction in one case and parallel to the field direction in the other case, and is left-hand polarized in both cases. The corresponding polariton frequencies $\omega+$ and $\omega-$ are different for the two cases for a given absolute value $q$. Therefore, changing the direction of magnetic field puts the operation upon a different dispersion curve from that of the preceding operation.

Figure 3:
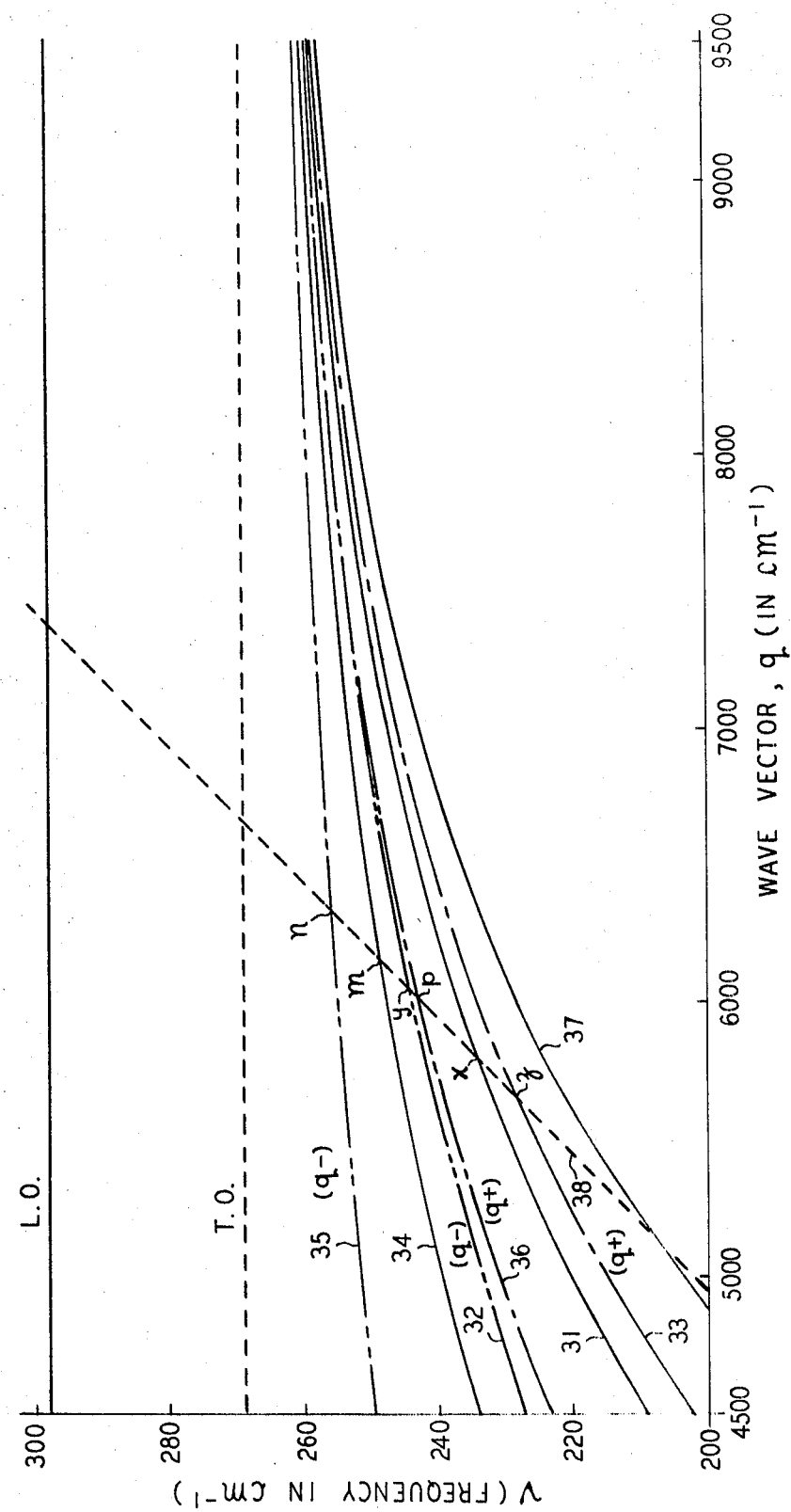
FIG. 3 shows curves which are helpful in understanding the theory and operation of the invention.

As may be seen from the dispersion curves of FIG. 3, two such dispersion curves 32 and 33 lie on opposite sides of the zero-field dispersion curve 31, all of which pertain to a charge carrier concentration of $1.4 \times 10^{17}$ per cubic centimeter. Polariton frequency, $\nu$, in wave numbers is shown on the vertical axis and polariton wave vector $q$ in wave numbers is shown on the horizontal axis.

The operating points $x$, $y$ and $z$ lie on the intersections of the dispersion curves 31, 32 and 33, respectively, with the collinear phase-matching line 38 ($\theta=0°$). Curve 32 is the $q-$ curve described by equation (7) above; and curve 33 is the $q+$ curve described in equation (7) above.

Similarly for a different charge level $4.2 \times 10^{17}$, as produced by a greater current through circuit 16—20, a somewhat higher family of curves 34, 35, and 36 is obtained, corresponding to the previous curves 31, 32, and 33, respectively.

Let us consider operation described by curves 31, 32, and 33. As the field flux density, B, varies from 100 kilogauss in the direction of pump light propagation to zero the operating point along phase-matching line 38 moves from point $y$ to point $x$. The corresponding variation is polariton frequency, $\nu$, comparable to that obtained by a like variation of an orthogonal magnetic field.

As the field flux density varies from 0 to 100 kilogauss opposite to the direction of pump light, the operating point along phase-matching line 38 moves from point $x$ to point $z$, providing a continuous further variation in polariton frequency, $\nu$. In contrast, the prior technique employing an orthogonal field will cause the operating point to move back toward point $y$, certain frequencies being repeated, that is, obtained at two different field values.

Thus, my present invention provides an extended tuning range.

A more linear, though more restricted, variation of polariton frequency, $\nu$, with field, B, can be obtained with higher charge carrier concentrations, as illustrated by curves 34 (zero field), 35 ($q-$, field in forward direction), and 36 ($q+$, field in backward direction) of FIG. 3. The corresponding respective operating points are $m$, $n$ and $p$.

It should be understood that the slope of the phase-matching line 38 depends on the wave vector $\bar{k}_o$ of the supplied pumping light and on the wave vector $\bar{k}_s$ (or $\bar{k}_{as}$) of the scattered light.

The $\omega-k$ relationship for the phase-matching line 38 is determined by (for the Stokes scattering)
$$\omega = \omega_o - \omega_s \quad (8)$$
and
$$\underline{k} = \underline{k}_o - \underline{k}_s \quad (9)$$
where
$$k_o = \frac{n_o \omega_o}{c} \text{ and } k_s = \frac{n_s \omega_s}{c}$$

and $n_o$, $n_s$ are the refractive indices at frequencies $\omega_o$ and $\omega_s$ respectively. In general $n_o \neq n_s$ because of normal dispersion effects in the crystal.

Inherent in this arrangement is the possibility that, by resonating scattered light at a small angle with respect to the pump light direction, additional tuning can be achieved, even though tuning by this means is not considered highly desirable. Thus divergence between pump direction and the resonator axis of reflectors 14 and 15 as great as 1.2°, phase-matched operation still appears feasible.

For $\theta \neq 0$, phase-matching lines (similar to 38 for $\theta=0$) can be easily constructed from the following relationship
$$k = [k_o^2 + k_s^2 - 2k_o k_s \cos\theta]^{1/2}. \quad (10)$$

It should also be noted that, since crystal 11 is both Raman-active and infrared-active, the infrared emission at the polariton frequency becomes stimulated and coherent when the Raman-scattered light becomes stimulated and coherent. This coherent infrared emission may be quite useful and can be readily separated from the Raman-scattered light.

The carrier injection scheme illustrated in FIG. 1 is not the only way to change the carrier concentration and, consequently, the frequency of the mixed excitation involved in the Raman scattering in crystal 11. The carrier injection could, of course, be accomplished through a PN junction in the gallium arsenide. Such junctions are readily made in gallium arsenide, as is well known.

Figure 2:
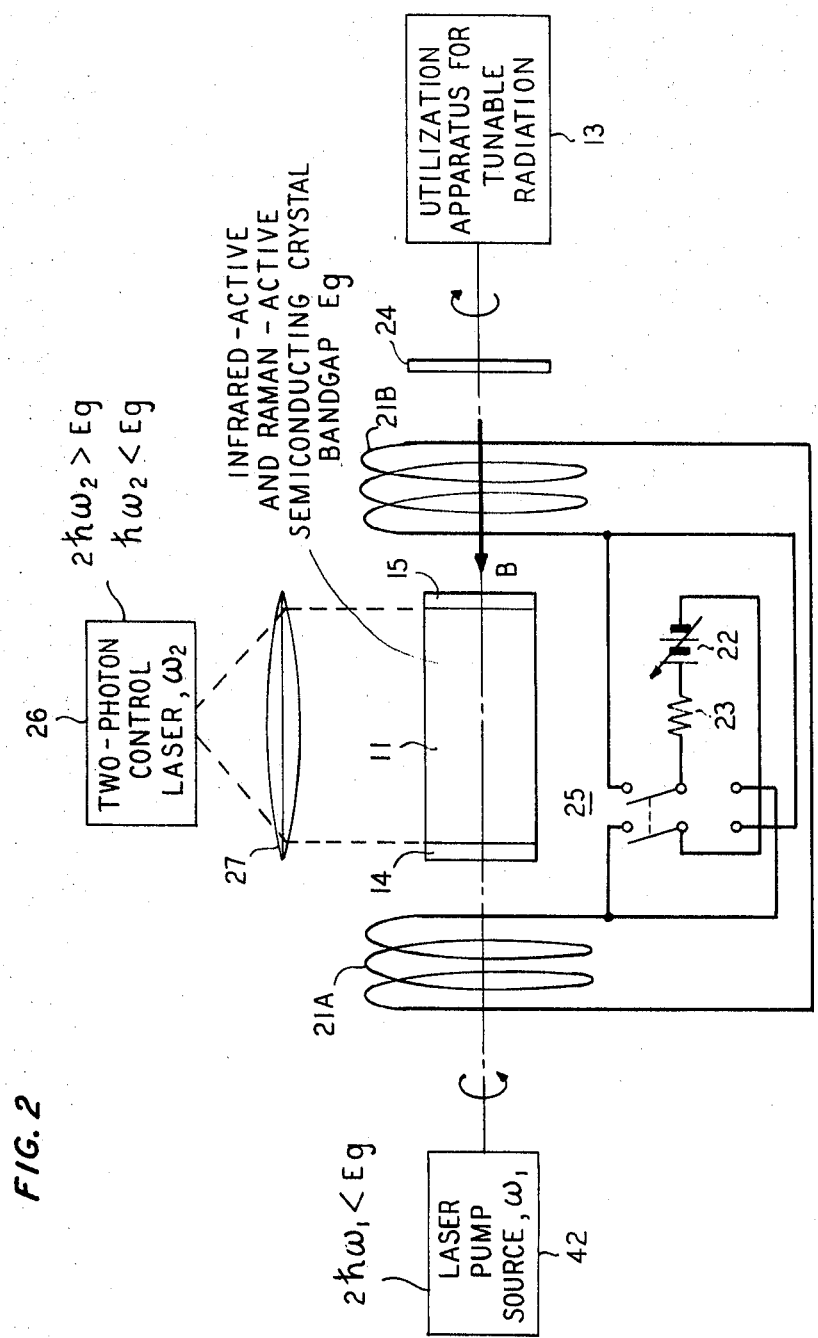
FIG. 2 is a partially pictorial and partially schematic illustration of a second embodiment of the invention employing control of carrier concentration by two-photon absorption.

In addition, carriers can be injected by two-photon absorption in the crystal 11, as shown in the modified embodiment of FIG. 2.

In FIG. 2 components like those of FIG. 1 are numbered the same as in FIG. 1. The laser pump source 42 is illustratively a carbon dioxide molecular laser, of type now well known in the laser art, operating at 10.6 microns in the far infrared and supplying circularly polarized radiation. The photon energy of this radiation is less than one-half the band gap energy $E_g$ of the gallium arsenide crystal 11. Thus,
$$2\hbar\omega_1 < E_g. \quad (11)$$
This provision is made so that no two-photon absorption of the pumping radiation can occur, regardless of its intensity.

Simultaneously, additional light at a higher frequency $\omega_2$ is applied transversely to crystal 11 from a control laser 26 of variable intensity through a collimating lens 27, which applies a broad parallel beam of the light to crystal 11. This beam extends between reflectors 14 and 15 and fills the crystal substantially uniformly. Its intensity per unit area is in the range of $10^8$ watts per square centimeter. At this intensity level substantial two-photon absorption will occur in the gallium arsenide, if twice the photon energy of the laser radiation is greater than the band gap of crystal 11;
$$2\hbar\omega_2 > E_g. \quad (12)$$
Two-photon absorption produces additional carriers by producing electron-hole pairs. In order that the laser radiation from laser 26 can extend through the crystal 11, it is also desirable that the energy of a single photon is less than the band gap energy,
$$\hbar\omega_2 < E_g. \quad (13)$$
Thus, the laser 26 can be a high-power neodymium ion laser or an array of such lasers operating at 1.06 microns and providing the required intensity per unit area.

In operation as the intensity of light from laser 26 is varied, the amount of two-photon absorption varies. The frequency of the mixed excitation from which Raman scattering occurs will vary in dependence upon the carrier concentration and the field in a manner similar to that previously described with reference to FIG. 3. For a given value of the carrier concentration thus achieved, two-photon absorption is entirely equivalent to other forms of carrier injection, e.g., that of FIG. 1, for the purpose of the invention. The two-photon source light need not be coherent.

As a further consequence of this similarity in operation, the effect of variation of the magnetic field applied by coil 21A, 21B to crystal 11 will be the same as in the embodiment of FIG. 1, as heretofore explained with reference to FIG. 3.

The range of initial carrier concentrations of crystal 11 usable in the present invention extend from $1\times10^{10}$ per cubic centimeter to $1\times10^{19}$ per cubic centimeter. The magnetic fields may vary from 0 to values as great as can be practically achieved, e.g., several hundred kilogauss. significantly in either polarity.

It should be understood that variation in temperature will have some effect, not necessarily deleterious, upon the tuning and range of tuning of the disclosed embodiments of the invention and that some tuning by rotation of a crystal through angles of the order of 1° is also feasible as a supplement to the technique of the invention. It should be noted that the reference to substantial colinearity between the pumping light and the scattered light comprehends the possible angular deviation therebetween of about 1°. It should be clear that many other semiconducting crystals can be used in the present invention. The preferable ones are those which have both Raman-active and infrared-active phonons and which are transparent to the optical frequencies employed.

By employing the term polariton, I do not wish to limit my invention to only those mixed excitations which have currently been reported in the literature; but use the term generically for all mixed excitations in which a photon is involved.

I claim:

1. A coherent optical oscillator apparatus comprising a semiconductive body that has phonons which are both Raman-active and infrared-active, means for supplying circularly polarized coherent optical pumping radiation along a first axis extending through said body, means for resonating radiation scattered from a mixed excitation in said body along a second axis substantially collinear with said first axis, said resonated scattered radiation being phase-matched to said pumping radiation and said mixed excitation, and means for applying to said body a magnetic field substantially colinearly with said axes to vary the frequency of said excitation.

2. A coherent optical oscillator apparatus according to claim 1 in which the field-applying means is capable of supplying a field variable through substantial ranges of values of both polarities substantially colinearly with said axes.

3. A coherent optical oscillator apparatus according to claim 2 in which the scattered radiation is circularly polarized in a sense opposite to that of the circularly polarized supplied radiation, the apparatus including means for separating said radiations after transmission from said body.

4. A coherent optical oscillator apparatus according to claim 1 including means for injecting carriers into the semiconductive body to supplement said magnetic field in varying the frequency of the mixed excitation.